United States Patent Office 2,941,755
Patented June 21, 1960

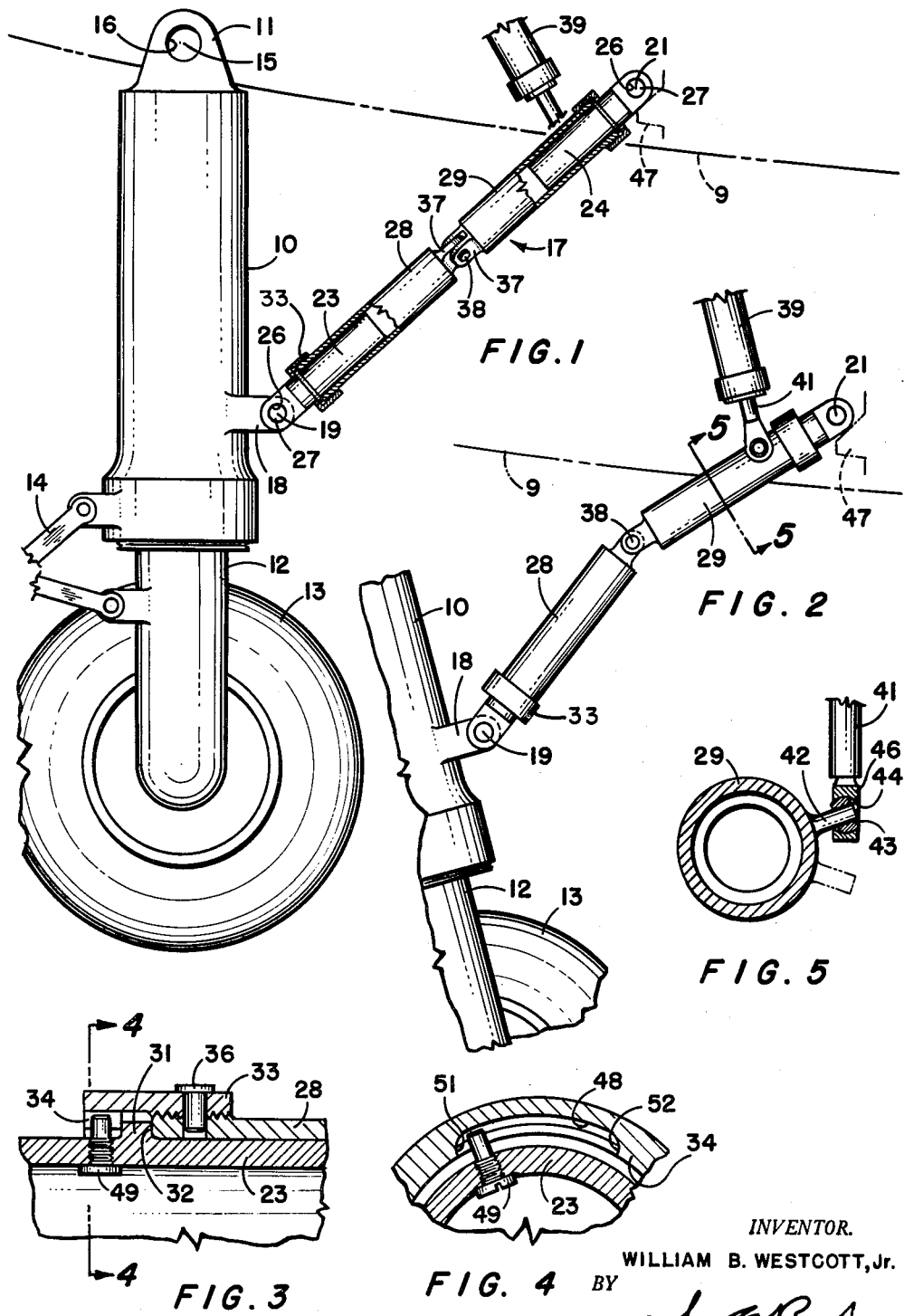

2,941,755

AIRCRAFT LANDING GEAR LOCK MECHANISM

William B. Westcott, Jr., Cleveland Heights, Ohio, assignor to Cleveland Pneumatic Industries, Inc., Cleveland, Ohio, a corporation of Ohio Filed Aug. 25, 1955, Ser. No. 530,503

6 Claims. (Cl. 244—102)

This invention relates generally to aircraft landing gears and more particularly to a new and improved collapsible drag brace structure therefor incorporating novel locking means.

It is an important object of this invention to provide a new and improved drag brace structure for landing gears incorporating a novel lock mechanism.

It is another important object of this invention to provide a collapsible drag brace structure for use with a retractable landing gear having a simple locking means which operates to hold a landing gear in the extended position.

Further objects and advantages will appear from the following description and drawings, wherein:

Figure 1 is a side elevation showing the preferred form of this invention as it would be applied to an aircraft landing gear illustrating the position of the drag brace elements when it is in the locked position;

Figure 2 is a fragmentary side elevation showing the position of the drag brace elements during the retraction;

Figure 3 is an enlarged fragmentary longitudinal section showing the swivel connection between the lower drag link member and the lower drag link cylinder;

Figure 4 is a fragmentary cross section taken along 4—4 of Figure 3; and,

Figure 5 is a fragmentary cross section taken along 5—5 of Figure 2 showing the mounting of the retraction actuator on the drag brace.

In modern retractable landing gear, power actuation means are utilized for the retraction and extension of the gear. It is normally necessary to provide a drag brace which is collapsible to permit the retraction of the gear but which may be locked in the extended position to provide lateral support for the landing gear. This invention is directed to a new and improved drag brace structure and actuator combination which incorporates a novel automatic locking means.

Figure 1 shows the drag brace according to this invention installed on a landing gear providing an upper telescoping member 10 mounted on the frame of the aircraft, shown schematically at 9, by a bifuracted lug 11 and a lower telescoping member 12 axially movable relative to the upper telescoping member 10. A ground engaging wheel 13 is journaled for rotation on the lower telescoping member 12 and torque arms 14 are pivotally connected between the two telescoping members to prevent relative rotation while permitting relative axial motion therebetween. The landing gear itself is of conventional design and includes an oleo mechanism to absorb the impact shock of landing as well as support the weight of the aircraft when it is on the ground. The lug 11 is mounted on the air frame in a manner which permits the retraction by rotating the gear around the axis 15 of a pivot pin 16 extending through the lug 11 until the landing gear is within the envelope of the aircraft.

A sectional drag brace shown generally at 17 is pivoted at one end of a mounting lug 18 formed on the upper telescoping member 10 for rotation around a pivot axis 19 parallel to the axis 15. The other end of the drag brace 17 is pivoted on the frame of the aircraft for rotation around a pivot axis 21 which is parallel to the pivot axes 15 and 19. The aircraft frame is shown schematically at 9 to indicate the pivot axis 21 is on the aircraft frame.

The sectional drag brace 17 itself includes cylindrical drag link members 23 and 24 at each end which are formed with eyelets 26 through which pivot pins 27 project so that the drag link members 23 and 24 can rotate around the pivot axes 19 and 21 respectively in a plane perpendicular to the pivot axes while being restricted against motion in any other plane. A cylinder or swivel member 28 and 29 fits over each of the drag link members 23 and 24 respectively for rotation around the longitudinal axis thereof. Each cylinder is connected to its respective rag link member by an annular shoulder 31 formed on the drag link member, which shoulder engages the end 32 of the cylinder, see Figure 3. A flanged nut 33, threaded onto the end of the cylinder 28, is formed with an inwardly projecting flange 34 which engages the shoulder 31 on the side opposite from the end 32. Thus the flange is positioned between two axially spaced walls so that relative axial motion between the cylinder 28 and the drag link member 23 is prevented even though they can rotate relative to each other. A locking pin 36 prevents rotation of the flanged nut 33 relative to the cylinder 28.

The two cylinders or swivel members 28 and 29 are each formed with pivot lugs 37 through which a pivot pin 38 projects so that the two cylinders 28 and 29 are connected together for rotation in a plane perpendicular to the axis of the pivot pin 38. When the pivot axes 15, 19 and 21 are parallel to the axis of the pivot pin 38 the planes of rotation of all of the pivots are coincident so the sectional drag brace 17 may be folded as shown in Figure 2. When however the axis of the pivot pin 38 is not parallel to the pivot axes 15, 19 and 21 a locked system results and it is impossible for any of the members to rotate around the respective pivots. This is due to the fact that the planes of rotation of all of the pivots are not either parallel or coincident. Therefore when it is desired to lock the drag brace 17, it is merely necessary to rotate the two cylinders 28 and 29 and the pivot pin 38 around the longitudinal axes of the drag link members 23 and 24 until the axis of the pivot pin 38 is not parallel to the pivot axes 19 and 21. It should be noted that this can only be accomplished when the cylinders 28 and 29 are aligned as shown in Figure 1.

I prefer to provide a retraction actuator which in the illustrated case is a fluid actuated cylinder and piston wherein the cylinder 39 is adapted to be mounted on the frame of the aircraft and the piston 41 is connected to the cylinder 29 by a swivel connection best shown in Figure 5. The cylinder 29 is formed with a laterally extending arm 42 on which is mounted a spherical member 43. The spherical member 43 fits into a spherical recess 44 in an end member 46 mounted on the piston 41. By utilizing this connection a structure is provided whereby the piston 41 can be swiveled in all directions relative to the arm 42. Assuming the elements are in the position shown in Figure 1 and it is desired to retract the landing gear, fluid under pressure is supplied to the piston and cylinder 41 and 39 in a manner which will cause the piston 41 to move upwardly relative to the cylinder 39. The first portion of the travel will cause the cylinder 29 to rotate around its axis and in turn rotate the cylinder 28 and the pivot pin 38 until the axis of the pivot pin 38 is parallel to the pivot axes 15, 19 and 21. At this time the drag brace is unlocked and further upward movement of the piston 41 relative to the cylinder 39 causes the drag link member 24 to rotate around its pivot axis 21 as shown in Figure 2. This in turn causes the upper telescoping member 10 to rotate around its mounting until the landing gear is in the retracted position. When it is desired to extend the landing gear, it is merely necessary to reverse the fluid connections to the piston and cylinder 41 and 39 so that the piston 41 moves downwardly relative to the cylinder 39. This causes rotation of the drag link member 24 around the pivot axis 21 back to the position shown in Figure 1. As soon as the drag link member 24 reaches the position shown in Figure 1 it engages a stop 47 shown schematically in Figure 1 which prevents further rotation around the pivot axis 21. At this time the cylinders 28 and 29 are aligned. Further downward motion of the piston 41 after the drag link member 24 engages the stop 47 causes rotation of the cylinders 28 and 29. This of course causes the axis of the pivot pin 38 to rotate to a non-parallel position relative to the pivot axes 15, 19 and 21, thereby locking the drag brace in the aligned position shown.

In order to limit the rotary motion of the cylinders 28 and 29 relative to the drag link members 23 and 24, I prefer to use the stop structure shown in Figure 4. The flange 34 is cut out to form a recess 48 into which the end of a lock pin 49, mounted on the drag link member 23, projects. The various proportions should be arranged so that the lock pin 49 engages the end wall 51 of the recess 48 when the drag brace 17 is locked and so that the lock pin 49 engages the opposite end wall 52 when the axis of the pivot pin 38 is parallel to the pivot axes 15, 19 and 21. This prevents excessive rotation of the cylinders 28 and 29.

It is apparent that a simple actuator may be used to retract the landing gear and operate the lock mechanism and that no special linkage is necessary to lock the drag brace after the landing gear is in the extended position.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A retractable landing gear mechanism comprising a strut member pivotally connected to an aircraft frame member, a sectional drag brace having end connections with said strut member and said frame member, at least one of said connections permitting pivotal motion of the associated drag brace section around a pivot axis parallel to the pivot axis of the pivotal connection of said strut member on said aircraft frame member, a pivotal intermediate connection between said sections of brace, the pivot axis of said intermediate connection being movable between a first position in which it is non-parallel to the pivot axis of said one end connection to prevent pivotal movement of said strut member and a second position in which it is parallel to the pivot axis of said one end connection, and means operatively connected to said intermediate connection effecting movement of the pivotal axis thereof between said first and second positions.

2. A landing gear mechanism comprising a strut member connected to an aircraft frame member, a pair of elongated drag link members one connected to said strut member and the other to said strut frame member, each connection permitting relative movement between associated members only in one plane, a swivel member on each of said link members, a pivot connection between said swivel members rotatable relative to said link members around the longitudinal axis thereof, and means operatively connected to one of said swivel members effecting said rotation between a first position wherein the axis of said pivot connection is perpendicular to said one plane and a second position wherein the axis of said pivot is inclined relative to said one plane.

3. A landing gear mechanism comprising a strut member connected to an aircraft frame member, a pair of elongated drag link members one connected to said strut member and the other to said aircraft frame member, each connection permitting relative movement between associated members only in one plane, a swivel member on each of said link members, a pivot connection between said swivel members rotatable relative to said link members around the longitudinal axis thereof, means operatively connected to one of said swivel members effecting said rotation between the first position wherein the axis of said pivot connection is perpendicular to said one plane and a second position wherein the axis of said pivot is inclined relative to said one plane, and stop means operatively connected to said pivot connection limiting said rotation of said pivot connection to motion between said first and second positions.

4. A retractable landing gear mechanism comprising a strut member pivotally connected to an aircraft frame member, a sectional drag brace having pivotal end connections with said strut member and frame member, connecting means between the sections of said brace enabling relative pivotal movement therebetween and a pivotal movement of said strut member, said connecting means including a pivotal connection having its pivotal axis movable from a normal position non-parallel to the axis of said end connections to prevent said pivotal movement of said strut member, and power means operatively connected to said connecting means exerting a force on said brace causing said pivotal connection to rotate until the axis thereof is parallel to the axis of said end connections and thereafter produce said pivotal movement of said strut member.

5. A retractable landing gear mechanism comprising a strut member connected to an aircraft frame member, a pair of elongated drag link members one connected to said strut member and the other to said aircraft frame member, each connection permitting relative movement between associated members only in one plane, connecting means between said link members including a pivot connection rotatable relative to said link members around a longitudinal axis thereof, and power means operatively associated with said connecting means effecting rotation of said pivot connection between a first position wherein the axis of said pivot connection is perpendicular to said one plane and a second position wherein the axis of said pivot is inclined relative to said one plane when the longitudinal axes of said link members are lined, said power means producing relative movement between said members in said one plane when said pivot connection is in said first position.

6. In a device of the character described a landing gear strut member pivotally connected to the frame of an aircraft for rotation relative thereto, a first drag link section, connecting means between said section and said strut member enabling rotation of the link section around a first pivot axis, a second drag link section, connecting means between said second link section and the aircraft frame enabling rotation of the second link section around a second pivot axis, connecting means between said drag link sections enabling relative rotation therebetween around a third pivot axis, and an actuator connected to one of said connecting means rotating the axis thereof between an unlocked position wherein it is parallel to all of the other of said pivot axes and a locked position wherein it is non-parallel at least to one of the other of said axes.

References Cited in the file of this patent
UNITED STATES PATENTS
2,474,694  Saulnier _____ June 28, 1949